United States Patent [19]

Handa

[11] Patent Number: 4,466,568

[45] Date of Patent: Aug. 21, 1984

[54] COMBUSTION TYPE HEATER FOR AUTOMOTIVE ROOM HEATING SYSTEM

[75] Inventor: Noritoshi Handa, Yokosuka, Japan

[73] Assignee: Nissan Motor Company, Limited, Yokohama, Japan

[21] Appl. No.: 416,567

[22] Filed: Sep. 10, 1982

[30] Foreign Application Priority Data

Oct. 26, 1981 [JP] Japan .................. 56-171195

[51] Int. Cl.³ .............................................. B60H 1/02
[52] U.S. Cl. ..................... 237/12.3 C; 126/110 B; 432/222
[58] Field of Search ............. 237/12.3 A, 12.3 B, 237/50, 46, 12.3 C; 126/110 AA, 110 E, 110 B; 432/222, 223; 98/2, 2.05; 123/41.7, 41.6, 198 E, 142.5 R

[56] References Cited

U.S. PATENT DOCUMENTS 2,065,251 12/1936 Sweeley et al. ............ 126/110 E X
3,964,462 6/1976 Thien et al. ................. 123/41.7
4,018,380 4/1977 Baier .......................... 237/12.3 C

FOREIGN PATENT DOCUMENTS 2623921 12/1977 Fed. Rep. of Germany ..... 237/12.3 C

Primary Examiner—Albert J. Makay
Assistant Examiner—Henry Bennett
Attorney, Agent, or Firm—Schwartz, Jeffery, Schwaab, Mack, Blumenthal & Koch

[57] ABSTRACT

In a combustion type heater for an automotive room heating system including a box-like casing which accommodates a combustor, an air blower for feeding air to the combustor, a fuel pump for feeding fuel to the combustor, a heat exchanger, etc., an outside air inlet port is formed in that portion of at least one side wall of the casing which is adjacent to the fuel pump. Air taken in through the outside air inlet port is caused to flow toward the fuel pump to cool it.

6 Claims, 7 Drawing Figures

COMBUSTION TYPE HEATER FOR AUTOMOTIVE ROOM HEATING SYSTEM

BACKGROUND OF THE INVENTION

1. FIELD OF THE INVENTION

This invention relates to improvements in or relating to a combustion type heater for an automotive room heating system.

2. DESCRIPTION OF THE PRIOR ART

In an automotive passenger compartment heating system, waste heat of engine cooling water or the like is utilized as a heat source. In the case of a bus or the like which is intended to be used in a cold district, however, since the heated load is relatively great as compared with the amount of heat emanating from the engine, a special heat source which results from combustion of petroleum fuel such as kerosene, light oil or the like is utilized for heating the passenger compartment. Alternatively, a combustion type heater is installed which is independently operable whether the engine is running or stopped.

An example of a combustion type heater is shown in FIGS. 1 through 3 of the accompanying drawings, wherein air introduced into a box-like casing 1 through an air inlet portion 3 formed by a wire gauze or the like mounted on the top wall of the casing 15 is admitted through an admission port 4 into and pressurized in an air blower 2 which is centrally disposed in the casing 1 and driven by means of an electric motor or the like (not shown); and the air thus pressurized is fed from the air blower 2 into a combustor 6 through an air hose 5. The admission port 4 is disposed inside the casing 1 to prevent it from being clogged with snow and/or ice. Meanwhile, fuel from an external fuel tank (not shown), while being passed through fuel pipes 7 and 8, is pressurized by an electromagnetic fuel pump 9 and then fed to the combustor 6. The fuel thus fed to the combustor 6 is ignited by an ignition plug 10. A heat exchanger 11 integral with the combustor 6 is provided in which engine cooling water, for example, is heated by combustion gas which results from the combustion of the fuel.

Engine cooling water is introduced, through a cooling water inlet port 12, into the heat exchanger 11 by means of a water pump 13, sufficiently heated in the heat exchanger, and then passed, via a cooling water output port 14, to a heater core (not shown) provided for the room heating purposes in the passenger compartment, so that warm air is fed from the heater core to warm up the passenger compartment of the motor vehicle. In this way, an enhanced heating performance can be achieved when the motor vehicle is used in a cold district where heat from the engine alone is not sufficient to satisfactorily warm up the passenger compartment of the motor vehicle. The water pump 13 is driven, like the air blower 2, by means of an electric motor energized by a battery.

However, the aforementioned conventional combustion type heater is disadvantageous in that since air for combustion is introduced only through the air inlet port 3 provided at the top of the casing 1, the air thus introduced tends to stagnate in a lower portion of the casing 1 and to be heated by heat irradiated from the combustor 6 and so forth so that the temperature of the surrounding components tends to be gradually elevated. If the combustion type heater continues to be operated for a long time when the open air temperature is not so low, then the temperature of the fuel pump 9 and so forth will considerably be elevated, as a result of which fuel will be evaporated in the fuel pump 9 and in the neighborhood of the outlet of the pump so that there will occur a so-called vapor lock condition which will in turn cause intermittent fuel supply, thus resulting in the heating power of the heater being weakened and the combustion becoming unstable. Furthermore, if the air inlet port 3 is covered with snow or is frozen, then air introduction effected therethrough will become difficult so that the air blower and so forth will be overloaded and thus subjected to failure such as by seizure, short or the like.

SUMMARY OF THE INVENTION

Accordingly, it is a primary object of the present invention to obviate the aforementioned disadvantages with the prior art.

Another object of the present invention is to provide a combustion type heater wherein small apertures are formed in that portion of a side wall of a casing which is adjacent to a fuel pump so that air fed to a combustor by an air blower is taken in through the small apertures, and the fuel pump is cooled by the air thus taken in.

Other objects, features and advantages of the present invention will become apparent from the ensuing description taken in conjunction with the accompanying drawings.

DESCRIPTION OF THE PREFERRED EMBODIMENTS

Figure 1:
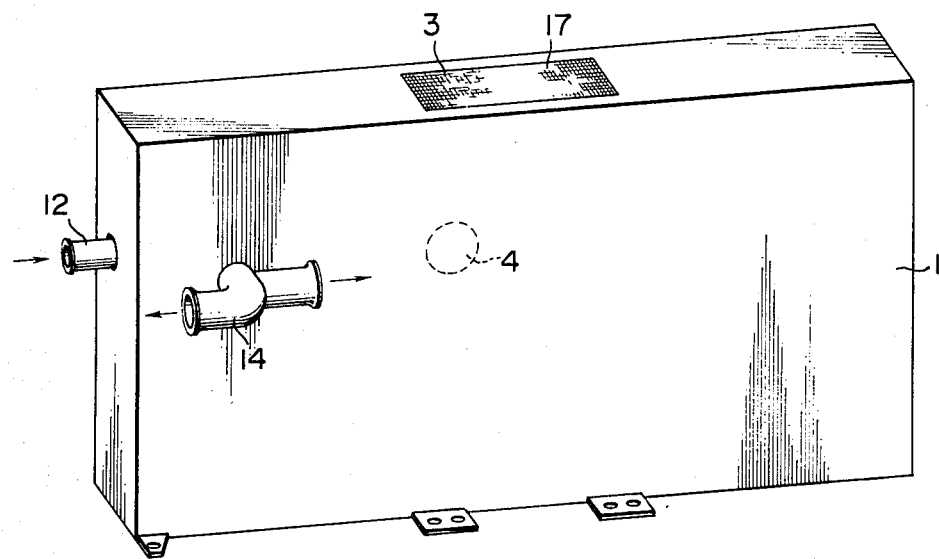
FIG. 1 is a perspective view showing the conventional combustion type automotive room heating device.
Figure 4:
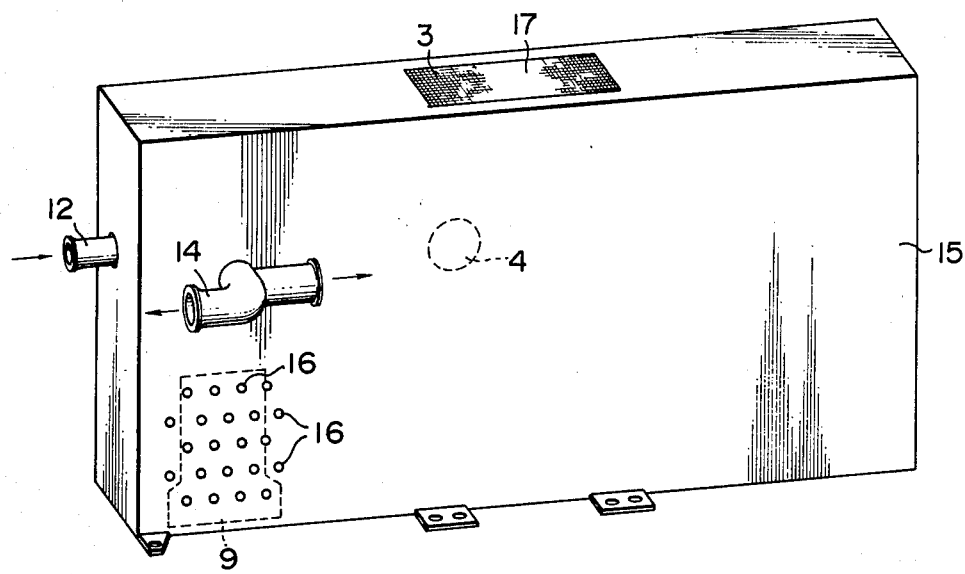
FIG. 4 is a perspective view showing the combustion type automotive room heating device according to an embodiment of the present invention.
Figure 2:
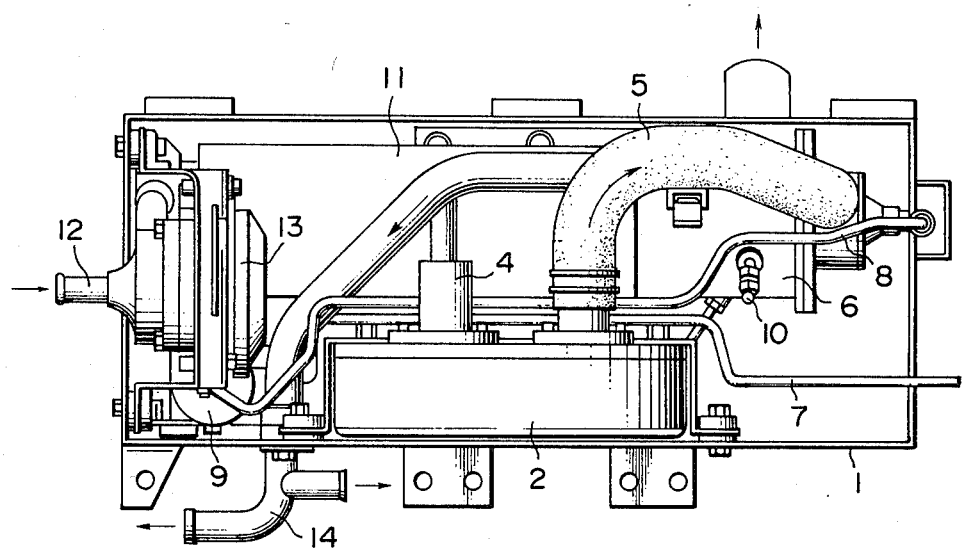
FIGS. 2 and 3 are views showing the inner arrangement of the device shown in FIG. 1.
Figure 3:
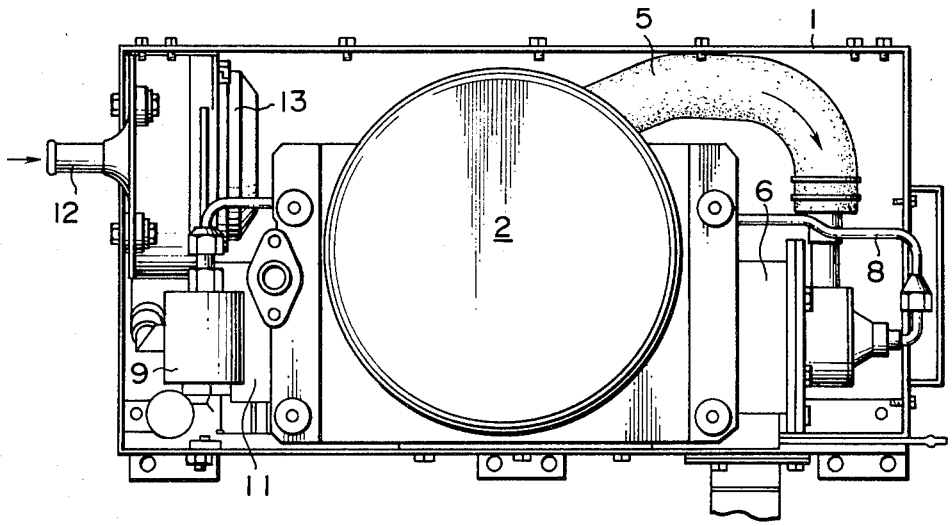

Referring to FIG. 4 of the drawings, there is shown the combustion type automotive room heating device according to an embodiment of the present invention, which includes a box-like casing 15 in which are accommodated an air blower 2, a combustor 6, a fuel pump 9, a water pump 13 and so forth such as those illustrated and described in connection with FIGS. 2 and 3. In this embodiment, engine cooling water, which is taken in through a cooling water inlet port 12, is introduced, by means of the water pump 13, into a heat exchanger 11 accommodated in the casing 15, and heated therein; and the engine cooling water thus heated is taken out of a cooling water outlet port 14 to be passed to front and rear heater cores (not shown).

Formed in the top wall of the casing 15 is an air inlet port 3 through which air for combustion is taken in to be passed, under the action of the air blower 2, to the combustor 6. According to this embodiment of the present invention, besides the aforementioned air inlet port 3, an additional air inlet port which comprises an array of small apertures 16, is formed in a side wall of the casing 15 adjacent to the fuel pump 9. Preferably, the apertures 16, each of which may be of a relatively small size, are spread over a range which substantially corresponds to the projected area of the fuel pump 9 with respect to the side wall of the casing 15. It is also possible that the apertures 16 may be formed in each of the opposite side walls of the casing 15 adjacent to the fuel pump 9. The air inlet port 3 formed in the top wall of the casing 15 should preferably be covered with a wire gauze 17 to prevent snow or the like from entering the casing.

With the foregoing construction of the present invention, when the present combustion type heater is operated to warm up the passenger compartment of the motor vehicle, fuel is supplied to the combustor 6 by means of the fuel pump 9, and at the same time air for combustion is fed thereto by means of the air blower 2. In this connection, it is to be particularly noted that the air for combustion is introduced not only through the air inlet port 3 formed in the top wall of the casing 15 but also through the apertures 16 formed in the side wall of the casing 15.

The flow of air introduced through the apertures 16 which is relatively cold, is made to impinge upon the fuel pump 9 and flow along the peripheral surface thereof and into the inlet port 4 of the air blower 2. Thus, the fuel pump 9 is sufficiently cooled down by the relatively cold air flow which is also effective to prevent relatively hot air, which is heated by the heat irradiated from the combustor 6 and so forth, from stagnating in the lower portion of the casing 15.

As will be appreciated from the above explanation, according to the present invention, it is possible to avoid such problems with the prior art that the temperature of the fuel pump 9 is elevated so that fuel is evaporated therein, as a result of which the fuel supply to the combustor 6 is restrained. Thus, according to the present invention, a stable combustion condition can always be established, which results in satisfactory heating performance.

With the aforementioned conventional construction, even when the open air temperature is below 0° C., the surface temperature of the fuel pump 9 becomes as high as about 80° to 85° C., whereas it has been confirmed that such surface temperature can be made to be lower than 60° C. by providing the apertures 16 in accordance with the present invention. In addition, even when wire gauze covering the air inlet port 3 is covered with snow or frozen, it is possible to prevent the blower motor from being overloaded, by virtue of the fact that air for combustion can be supplied to the air blower 2 through the apertures 16.

According to the embodiment of the present invention, the performance of the heating device can be improved simply by providing the apertures adapted to serve as additional air inlet port in the side wall or walls of the casing 15, so that the reliability of the device can be enhanced.

Figure 5:
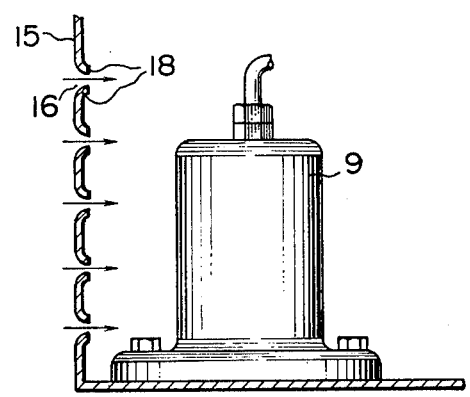
FIGS. 5 through 7 are fragmentary sectional views showing embodiments of the present invention, respectively.

Referring now to FIG. 5, there is shown another embodiment of the present invention, wherein guides 18 for guiding the flow of introduced air are provided downstream of the array of apertures 16 formed in the side wall of the casing 15. The guides 18 may be formed, together with the apertures 16, by means of stamping. With such an arrangement, the flow of air taken in through the apertures 16 can more effectively be passed to the fuel pump 9 so that more efficient cooling of the fuel pump 9 can be achieved.

Figure 6:
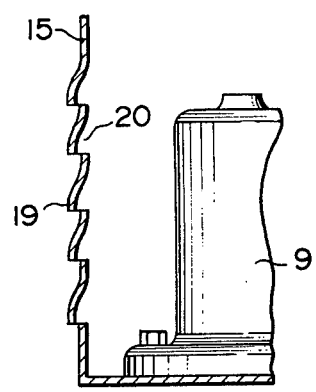

Referring to FIG. 6, there is shown still another embodiment of the present invention, wherein a louver 19 adapted to serve as additional air inlet port is formed in the side wall or walls of the casing 15. With this arrangement, it is possible to prevent snow, hail, rain or the like from entering the casing 15. Preferably, a wire gauze 20 is provided in back of the louver 19, thereby preventing bugs or the like from entering the casing 15.

Figure 7:
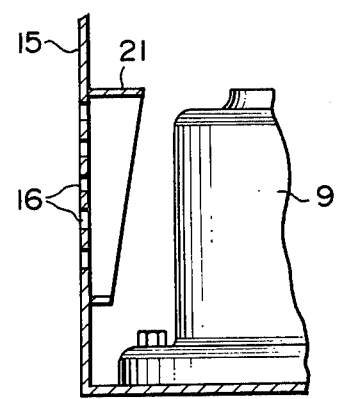

Referring to FIG. 7, there is illustrated a further embodiment of the present invention, wherein a hood 21 is attached to the inner surface of the side wall of the casing 15 where the apertures 16 are formed, thereby introducing the intake air flow to the fuel pump 9. With this embodiment, it is possible not only to prevent hot air from stagnating in the lower portion of the casing 15 but also to increase the durability of components such as the harness and so forth. Furthermore, even if the air inlet port 3 formed in the top wall of the casing 15 is closed with snow or the like, air can be taken in through the apertures 16 so that combustion can be effected without hindrance.

In each of the foregoing embodiments, it will be appreciated that it is not always essential to provide the air inlet port 3 in the top wall of the casing 15.

As will be appreciated from the foregoing discussion, the heating device according to the present invention is arranged such that air to be fed to the combustor by means of the air blower is taken in through the air inlet port formed in the side wall or walls of the casing, and the fuel pump is cooled by the air thus taken in, so that stable fuel supply to the combustor is maintained, thereby enabling the heating device to operate satisfactorily.

While the present invention has been illustrated and described with respect to specific embodiments thereof, it is to be understood that the present invention is by no means limited thereto but encompasses all changes and modifications which will become possible within the scope of the appended claims.

What is claimed is:

1. A combustion type heater for an automotive interior space heating system, comprising:
    a combustor;
    an air blower for feeding air to said combustor;
    a heat exchanger for heating an automotive interior space heating medium with combustion gas resulting from combustion of a mixture of said fuel and air in said combustor;
    a box-like casing accommodating said combustor, said air blower, said fuel pump, and said heat exchanger, said box-like casing having a top wall and at least one side wall having a portion adjacent said fuel pump;
    a first outside air inlet port means comprising an opening disposed in said top wall of said casing and an air path to said blower for permitting air to enter said blower through said casing; and
    a second outside air inlet means for providing air to said blower, said second outside air inlet means comprising at least one opening disposed in said portion of said at least one side wall of said casing which is adjacent to said fuel pump, and an air path to said blower, said air path of said second outside air inlet means being directed at and along said fuel pump such that air introduced through said at least one opening is made to impinge upon said fuel pump and flow along the peripheral surface thereof and into said air blower.

2. A combustion type heater according to claim 1 wherein said second outside air inlet means comprises an array of relatively small apertures formed in said at least one side wall of said casing in such a manner as to be spread over a range substantially corresponding to the projected area of said fuel pump with respect to said at least one side wall of said casing.

3. A combustion type heater according to claim 2 further comprising guides provided in association with said apertures respectively for guiding air taken in through said apertures toward said fuel pump.

4. A combustion type heater according to claim 2 further comprising a hood provided in association with said array of relatively small apertures for guiding air taken in through said apertures toward said fuel pump.

5. A combustion type heater according to claim 1 wherein said second outside air inlet means comprises a louver.

6. A combustion type heater according to claim 5 further comprising a wire gauze provided inside said louver in opposing relationship thereto.

* * * * *